United States Patent [19]

Stansfeld

[11] 3,916,672
[45] Nov. 4, 1975

[54] APPARATUS FOR MEASURING THE SPECIFIC GRAVITY OF GASES

[75] Inventor: James Wolryche Stansfeld, Beech, England

[73] Assignee: The Solartron Electronic Group Limited, Farnborough, England

[22] Filed: Nov. 19, 1973

[21] Appl. No.: 417,176

[30] Foreign Application Priority Data
Nov. 27, 1972 United Kingdom............... 54802/72

[52] U.S. Cl.......................................... 73/30; 73/25
[51] Int. Cl.² .......................................... G01N 31/00
[58] Field of Search............................ 73/25, 30, 23

[56] References Cited
UNITED STATES PATENTS
| | | | |
|---|---|---|---|
| 1,677,835 | 7/1928 | Linderman.............................. | 73/30 |
| 2,586,899 | 2/1952 | Yanikowski ............................ | 73/25 |
| 3,516,283 | 6/1970 | Abbotts .................................. | 73/30 |

OTHER PUBLICATIONS
Instruments, "The Metric Gravitometer," Sept. 1933, p. 181.

Primary Examiner—Richard C. Queisser
Assistant Examiner—John S. Appleman
Attorney, Agent, or Firm—William R. Sherman; Stewart F. Moore

[57] ABSTRACT

A transducer for measuring the specific gravity of a gas comprises a vibrating cylinder density transducer arranged to receive the gas, a chamber containing a fixed mass of a reference gas arranged in heat exchange relationship with the gas flowing through the density transducer, and a pressure control valve connected downstream of the density transducer. The control valve is responsive to the pressure difference between the reference gas and the gas leaving the density transducer, and maintains the pressure of the gas leaving the density transducer equal to the pressure of the reference gas. It can be shown that under these conditions, the density signal produced by the density transducer is also proportional to the specific gravity of the gas flowing therethrough.

4 Claims, 1 Drawing Figure

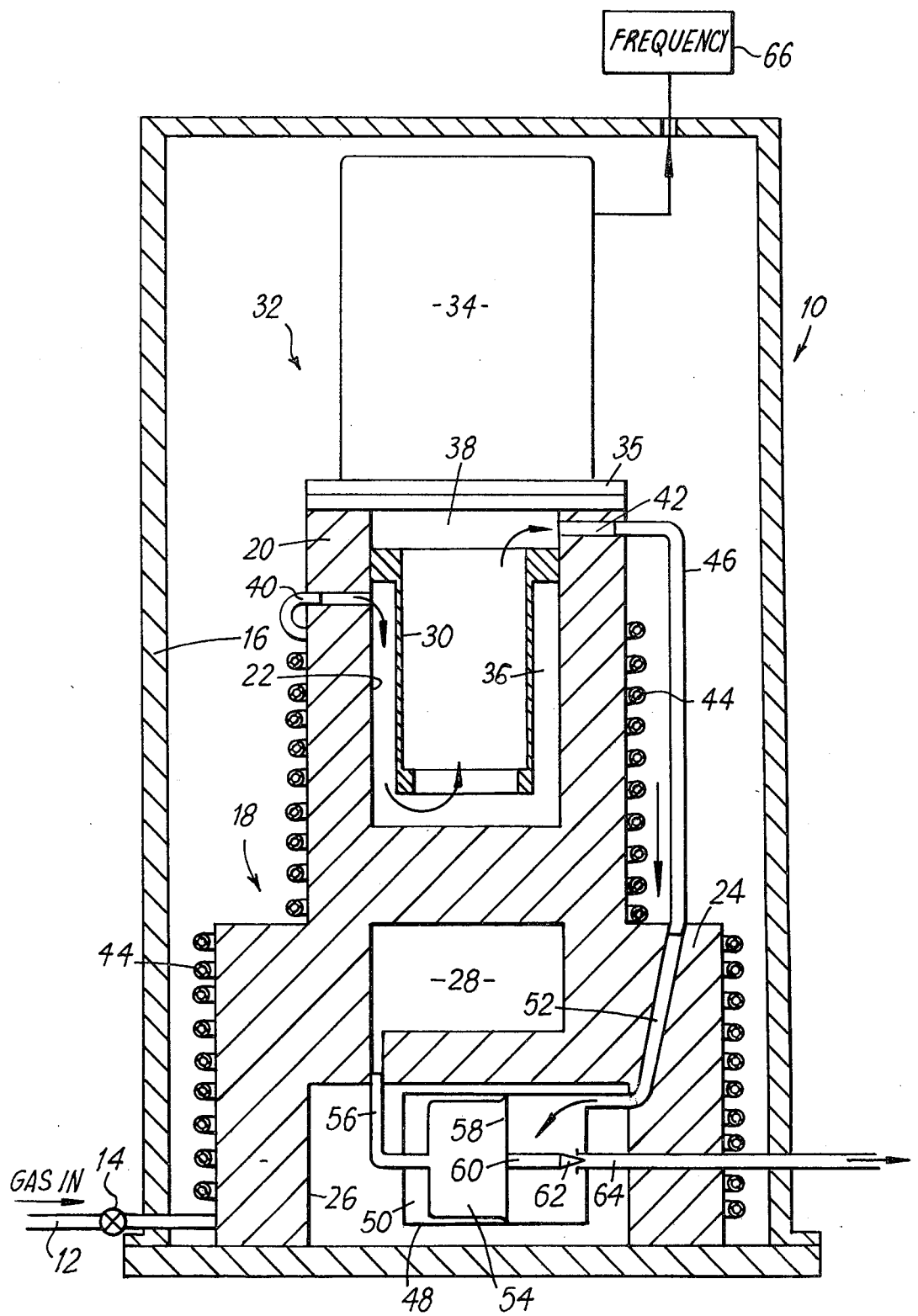

APPARATUS FOR MEASURING THE SPECIFIC GRAVITY OF GASES

This invention relates to apparatus for measuring the specific gravity of gases.

In the gas industry, it is frequently required to measure the specific gravity of natural or town gas being supplied to consumers, for example to facilitate calculation of the price of the gas supplied. Previously, the specific gravity of the gas has been measured by a balancing method in which a sample of the gas is weighed, but this method is timeconsuming and inaccurate, and is not suitable for use on a continuous basis.

The specific gravity Sg of a gas is given by $Sg = \rho g/\rho a$, where $\rho g$ and $\rho a$ are the respective densities of the gas and air, both at Standard Temperature and Pressure (STP). Since $\rho a$ is constant, the specific gravity Sg is proportional to $\rho g$. It is possible to continuously measure the density of a gas relatively accurately, but it is extremely difficult to ensure that at the same time the gas is continuously maintained at STP. In practice, therefore, in order to derive the specific gravity Sg from a density measurement, it would have been necessary also to measure at least temperature, and possibly pressure as well, and then to apply an appropriate correction to the density measurement, making such a method of measurement rather unattractive.

It is an object of the present invention to provide apparatus for measuring the specific gravity of gases, in which the aforementioned problems and disadvantages are substantially alleviated.

According to the present invention, therefore, apparatus for measuring the specific gravity of a gas comprises a conduit for receiving the gas whose specific gravity is to be measured, a density-sensitive device disposed in the conduit and arranged to produce an output signal representative of the density of the gas flowing through the conduit, a chamber containing a fixed mass of a reference gas disposed so as to remain at substantially the same temperature as the gas in the conduit, and pressure control means responsive to any difference between the pressure of the reference gas and the pressure of the gas in the conduit to adjust the pressure of the gas in the conduit so as to reduce said difference, whereby the density represented by said output signal is proportional to the specific gravity of the gas.

Thus at constant temperature, the pressure of the gas in the conduit is maintained constant and equal to that of the reference gas, irrespective of variations in the pressure of the supply from which the gas in the conduit is obtained. Moreover, ambient temperature variations, because they affect the reference gas and the gas in the conduit equally, have substantially no effect on the density measurement, since the effect on the density measurement of the pressure change in the gas in the conduit caused by the temperature change in the reference gas is substantially exactly compensated by the effect of the temperature change of the gas in the conduit. Under these conditions, therefore the density measurement is directly proportional to the specific gravity of the gas. The foregoing assumes that the supercompressibility factor of the gas in the conduit is unity, which requirement is relatively easily met by most gases in practice.

In a preferred embodiment of the invention, the pressure control means comprises an outlet valve arranged to control the venting of the gas from the conduit, and a movable diaphragm connected to operate the valve, opposite sides of the diaphragm being subjected to the respective pressures of the reference gas and the gas in the conduit.

The pressure control means is preferably arranged to maintain the pressure of the gas in the conduit at a value greater than but relatively close to normal atmospheric pressure.

Preferably the apparatus includes a heat sink, e.g. a relatively large piece of metal, the conduit and the chamber being disposed in intimate thermal contact with said heat sink. Thus a portion of the conduit may be wound round or disposed inside the heat sink, while the chamber may also be disposed inside the heat sink. The heat sink may conveniently be disposed so as to be subjected to normal ambient temperature.

The density-responsive device preferably comprises a vibratable member arranged to be exposed to the gas in the conduit, means for exciting the member to vibrate at its natural frequency, and means for producing an output signal representative of said frequency. The vibratable member may comprise a hollow right cylindrical shell member arranged to have both its internal and external surfaces exposed to the gas in the conduit, while the exciting means may be arranged to excite bell-like (hoop mode) vibrations of said cylindrical shell member.

The invention will now be described, by way of non-limitative example only, with reference to the accompanying drawing, which is a somewhat diagrammatic sectional view of apparatus for measuring the specific gravity of gases in accordance with the present invention.

The apparatus shown in the drawing is indicated generally at 10, and comprises an inlet pipe 12 adapted to be connected to receive the gas whose specific gravity is to be measured from, for example, a gas pipeline carrying natural gas, typically at a pressure of about 25 P.S.I. The inlet pipe 12 includes an adjustable pressure reducing orifice 14 whereby the pressure of the gas may be reduced to a more convenient value, and extends radially through the wall of a hollow, generally cylindrical housing 16 to the interior thereof.

The housing 16, which effectively constitutes a closed container for the remainder of the apparatus 10, comprises a polished metal skin lined with a thermally insulating material such as expanded polystyrene, and serves to shield the remainder of the apparatus 10 from draughts and short-term temperature fluctuations. A relatively massive, generally cylindrical, heat sink member 18 is disposed coaxially within the housing 16, and is mounted on the base thereof. The heat sink member 18 has an upper portion 20 containing a coaxially disposed, downwardly-extending cylindrical recess 22, and a lower portion 24 containing a coaxially disposed, upwardly-extending recess 26. Additionally, the heat sink member 18 contains a generally centrally disposed reservoir 28, filled with a reference gas such as air or nitrogen.

The recess 22 contains a vibrating cylinder density sensing device 30, which extends coaxially of the recess and forms part of an NT1794 gas density transducer manufactured by us and described in more detail in our United Kingdom Pat. Specification No. 1,175,664 (corresponding to U.S. Pat. No. 3,516,283, Abbotts). The transducer is indicated generally at 32, and includes an amplifier unit 34 for exciting and maintaining resonant hoop-mode vibrations of the cylinder 30 and for producing an output signal whose frequency is equal to the frequency of the vibrations. The amplifier unit 34 has a lower flange 35 which closes and seals the recess 22. The cylinder 30 is hollow, and effectively divides the recess 22 into two regions 36, 38, which communicate with each other via the hollow interior of the cylinder 30. An inlet 40 extending radially through the wall of the recess 22 communicates with the region 36, while an outlet 42, also extending radially through the wall of the recess 22, communicates with the region 38.

If desired, the upper portion 20 of the heat sink member 18 may in practice be constituted by the main vibrating cylinder housing of the transducer, which housing may be suitably clamped to the remainder of the heat sink member: for further details of the construction and operation of the transducer, the aforementioned Patent Specification should be consulted.

The portion of the inlet pipe 12 which is downstream of the orifice 14 and disposed inside the housing 16 is connected to the inlet 40 via a heat exchange pipe 44 wound spirally around, and in intimate thermal contact with, the lower portion 24 of the heat sink member 18. The outlet 42 is connected via a pipe 46 to a pressure regulating device 48, which is located in the recess 26 in the heat sink member 18, and which controls the pressure of the gas in the conduit defined by the pipes 44, 46 and the recess 22.

The pressure regulating device 48 comprises a chamber 50, having an inlet 52 connected to the pipe 46, and containing a capsule 54 whose interior communicates with the reservoir 28 via a pipe 56. The capsule 54 and reservoir 28 are sealed after they have been filled with the aforementioned reference gas, typically at a pressure of 16–17 P.S.I. (i.e. just above atmospheric pressure), and thus together contain a fixed mass of the reference gas. One wall of the capsule 54 comprises a flexible diaphragm 58, which is connected by means of a linkage 60 disposed externally of the capsule to a valve member 62. The valve member 62 controls the opening of a vent outlet 64 in the chamber 50, which outlet is vented to atmospheric pressure.

In operation, the gas whose specific gravity is to be measured enters the apparatus 10 by way of the inlet pipe 12, its pressure being reduced by the orifice 14 to a value just above atmospheric pressure as will hereinafter become apparent. The reduction in pressure cools the gas, which then flows through the heat exchange pipe 44, where its temperature is brought substantially to that of the heat sink member 18. It will be appreciated that the heat sink member 18 remains substantially at the ambient temperature and, because it has a relatively high thermal inertia and is shielded by the housing 16, changes its temperature relatively slowly. The gas at the temperature of the heat sink member 18 then enters the recess 22 via the inlet 40 thereof, and flows over both the external surface and the internal surface of the vibrating cylinder density sensing device 30, before leaving the recess 22 via the outlet 42 thereof. The cylinder 30 is excited to vibrate at its resonant frequency by the amplifier unit 34, as described in the aforementioned Patent Specification, the value of the resonant frequency being dependent upon the density of the gas to which the cylinder is exposed. The unit 34 thus produces an output signal whose frequency is representative of the density of the gas in the recess 22: the frequency of this output signal is measured by a frequency meter 66.

The gas leaving the recess 22 flows via the pipe 46 into the chamber 50, whence it is vented to atmospheric pressure via the outlet valve 62 and outlet 64. The diaphragm 58 adjusts the amount of opening of the outlet 64, by means of the linkage 60 and valve member 62, so as to adjust the pressure of the gas in the chamber 50 to be substantially equal to the pressure of the reference gas in the capsule 54. The pressure of the gas in the recess 22 is therefore also maintained substantially equal to the pressure of the reference gas.

As already mentioned, the specific gravity Sg of a gas is given by $Sg = \rho_g/\rho_a$ where $\rho_a$ is constant. But if $\rho_L$ is the measured density of the gas in the recess 22, then $$\rho_g = \rho_L \times \frac{T_L}{T_S} \times \frac{P_S}{P_L},$$

where
$T_L$ = temperature of gas in the recess 22—(Absolute)
$T_S$ = Standard Temperature—(Absolute)
$P_L$ = pressure of gas in the recess 22—(Absolute)
$P_S$ = Standard Pressure—(Absolute)

By substitution for $\rho_g$, and since $T_S$ and $P_S$ are constants, we obtain $$S_g = \rho_L \cdot \frac{T_L}{P_L} \times k,$$

where $k$ is constant.

But the pressure $P_L$ is controlled to be equal to that of the reference gas, whose volume is also fixed. Thus, for the reference gas $P_L$ = constant $x$ $T_{ref}$. However, the apparatus 10 is arranged so that the temperature $T_{ref}$ of the reference gas is at all times substantially the same as the temperature $T_L$ of the gas in the recess 22, since both gases are in intimate thermal contact with the heat sink member 18. Putting $T_{ref} = T_L$ gives Sg = constant X $\rho_L$.

Thus the frequency meter 66 can be calibrated directly in terms of specific gravity, typically by effecting measurements on pure gases of known specific gravity, e.g. nitrogen.

It will be appreciated that several modifications can be made to the described embodiment of the invention. For example, density transducers other than our NT1794 transducers may be used to measure the density of the gas flowing through the apparatus. Also, the pressure regulating device 48 can be replaced by another regulator of the "Cartesian bell" type, i.e. including a fixed mass of a reference gas.

What is claimed is:

1. An apparatus for measuring the specific gravity of a gas, comprising:
    a heat sink member having means defining a recess and having a substantially fixed-volume reservoir for containing a fixed mass of a reference gas said recess and said reservoir each being disposed inside said heat sink member;
    inlet conduit means for receiving the gas whose density is to be measured and for conducting it into said recess, and outlet conduit means for conducting said gas out of said recess, said inlet conduit means comprising an elongated conduit wound around and in intimate contact with said heat sink member, said conduit passing through said heat sink member;

said inlet conduit means, said recess and said reservoir all being in intimate thermal contact with said heat sink member so as to tend to maintain the gas in said recess at substantially the same temperature as the reference gas in the reservoir;

pressure control means responsive to any difference between the pressure of the reference gas and the pressure of the gas in said recess for reducing said difference to tend to equalize said pressures, said pressure control means comprising an outlet valve arranged to control the venting of the gas from said outlet conduit means, and a movable diaphragm connected to operate said valve, opposite sides of said diaphragm being subjected to the respective pressures of the reference gas and the gas in said outlet conduit means and hence in said recess; and a density sensitive device disposed in said recess and adapted to produce an output signal representative of the density of the gas flowing through said recess, whereby the density represented by said output signal is proportional to the specific gravity to be measured, said density sensitive device comprising a vibratable member arranged to be exposed to the gas in said recess, means for exciting the member to vibrate at its natural frequency, and means for producing an output signal representative of said frequency.

2. Apparatus as claimed in claim 1, wherein the pressure control means is arranged to maintain the pressure of the gas in the said recess at a value greater than but relatively close to normal atmospheric pressure.

3. Apparatus as claimed in claim 1, wherein the vibratable member comprises a hollow right cylindrical shell member arranged to have both its internal and external surfaces exposed to the gas in the said recess, and the exciting means is arranged to excite bell-like (hoop mode) vibrations of said cylindrical shell member.

4. Apparatus for measuring the specific gravity of a gas, comprising:

a heat sink member defining a recess and a substantially fixed-volume reservoir for containing a fixed mass of a reference gas, said recess and said reservoir both being disposed inside said heat sink member, an inlet conduit for receiving the gas whose density is to be measured and conducting it into said recess, and an outlet conduit for conducting said gas out of said recess, said inlet conduit, said recess and said reservoir all being in intimate thermal contact with said heat sink member so as to tend to maintain the gas in the recess at substantially the same temperature as the reference gas in the reservoir, said inlet conduit comprising a pipe wound around the outside of said heat sink member in intimate thermal contact therewith, said inlet conduit passing through said heat sink member to said recess, pressure control means responsive to any difference between the pressure of the reference gas and the pressure of the gas in the recess to reduce said difference and tend to equalize said pressures, said pressure control means comprising an outlet valve arranged to control the venting of the gas from the outlet conduit, and a movable diaphragm connected to operate the valve, opposite sides of the diaphragm being subjected to the respective pressures of the reference gas and the gas in the outlet conduit and hence in the recess, and a density-sensitive device disposed in said recess and adapted to produce an output signal representative of the density of the gas flowing through the recess, whereby the density represented by said output signal is proportional to the specific gravity of the gas, said density-sensitive device comprising a vibratable hollow right cylindrical shell member arranged to have both its internal and external surfaces exposed to the gas in the recess, means for exciting the vibratable shell member in bell-like, hoop made vibrations at a natural frequency thereof, and means for producing an output signal representative of said frequency, which signal is also the output signal proportional to the specific gravity of the gas.

* * * * *